Aug. 21, 1934.    T. S. MILLER ET AL    1,970,763
SPROCKET AND CHAIN CONSTRUCTION
Original Filed May 17, 1932
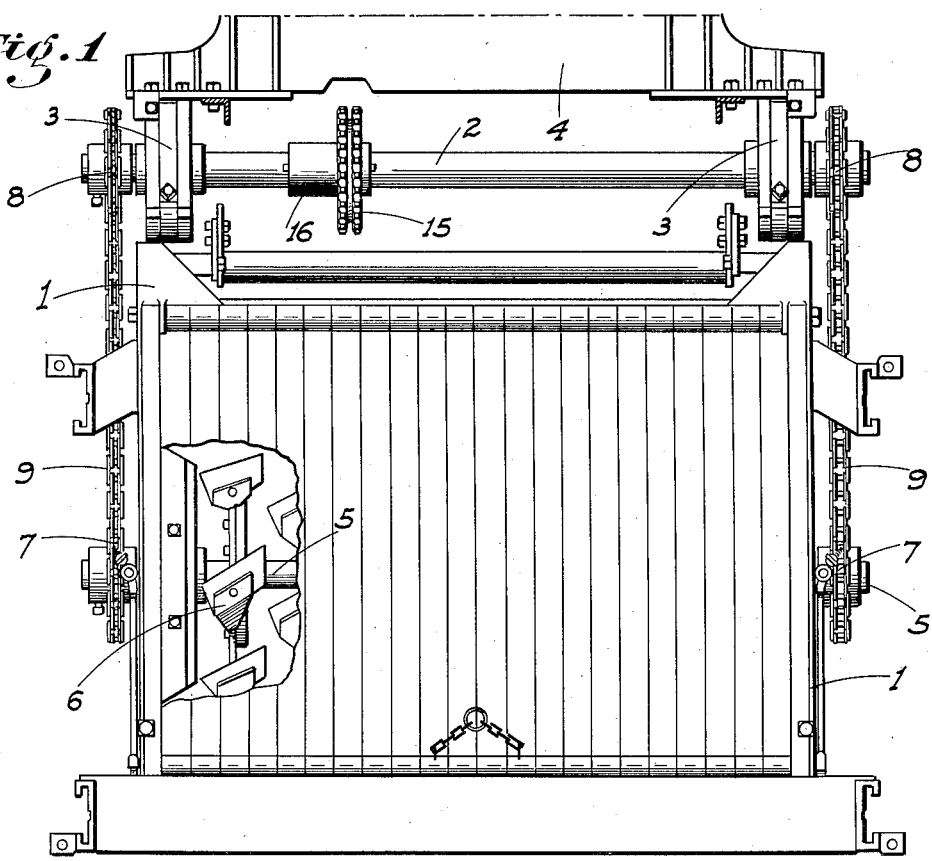
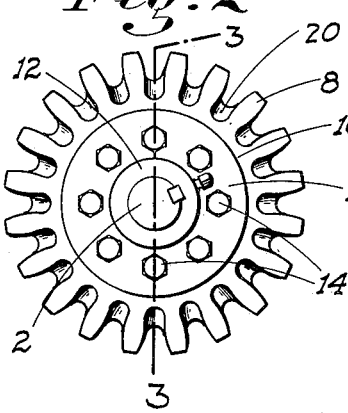
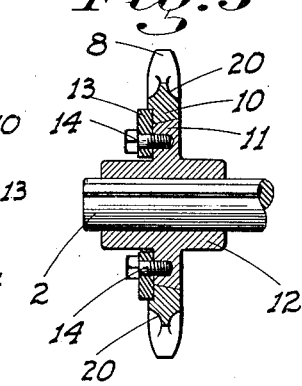
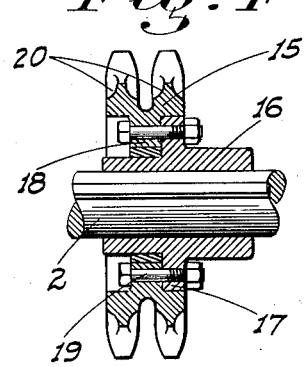
INVENTORS
T. S. Miller, Look L. Chong
Jue L. Chong and Sam L. Chong
BY                          ATTORNEY Patented Aug. 21, 1934

1,970,763

UNITED STATES PATENT OFFICE 1,970,763

SPROCKET AND CHAIN CONSTRUCTION

Tony S. Miller, Look L. Chong, Jue L. Chong, and Sam L. Chong, Isleton, Calif.

Original application May 17, 1932, Serial No. 611,840. Divided and this application October 7, 1932, Serial No. 636,639

1 Claim. (Cl. 74—245)

This invention relates to agricultural implements and is particularly a division of our co-pending application, Serial No. 611,840, filed May 17, 1932.

The agricultural implement to which this invention is applied comprises a rotary digging unit whose shaft is driven from its opposite ends by chains connected to a common drive shaft. One of the objects of this invention is to construct the sprocket wheels so that the opposed ones of the same may be so initially set and adjusted relative to each other as to positively and accurately equalize the pull on both chains, and thus eliminate the possibility of the shafts or chains being strained by an unevenly distributed pull.

We also found that in this implement, in which the chains are unavoidably and constantly exposed to dirt, that sprockets of the ordinary character soon became clogged with dirt between the teeth. This caused the chains to gradually climb and tend to be crowded off the sprocket wheels so that said chains became unduly taut, ultimately resulting in the breaking of the same or some of the sprocket teeth.

A further object of this invention therefore is to construct the sprocket wheels so that they are self-cleaning and the tendency for them to clog up with dirt is eliminated.

A still further object is to construct the main driving sprocket wheel so that in the event of an unyielding obstruction being encountered by the digging unit, certain relatively inexpensive and easily replaced parts will let go instead of the sprocket wheels and chains themselves being probably fractured or broken.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claim.

In the drawing similar characters of reference indicate corresponding parts in the several views:

Fig. 1 is a top plan view of a rotary digging unit and chain drive means applied thereto.

Fig. 2 is a side view of one of the special sprocket wheels detached.

Fig. 3 is a diametral section of the wheel from the line 3—3 of Fig. 2.

Fig. 4 is a similar view of a double drive sprocket wheel and the special form of hub for the same and the connecting means therebetween.

Referring now more particularly to the characters of reference on the drawing, the rotary digging unit comprises side frames 1 pivoted at their forward ends in axial connection with the drive shaft 2 which is journaled in boxes 3 supported by the frame member 4 which is mounted on the tractor and from which the shaft 2 is driven. Journaled in connection with the frames 1 parallel to the shaft 2 is the shaft 5 of the rotary digging unit 6 which is of the same general character as that shown in Patent No. 1,816,210, dated July 28, 1931, and others of a like nature.

Sprocket wheels 7 are fixed on the outer ends of the shaft 5 and are alined with similar sprocket wheels 8 mounted on the ends of the shaft 2, with chains 9 between corresponding pairs of sprockets, as shown in Fig. 1. One of the sprocket wheels 8 is in the form of a ring 10 which is taper bored to engaged the similarly sloping edge of a circular flange 11 formed on a hub 12 which is keyed to the shaft 2. The sprocket wheel at the small end of its bore overhangs the adjacent side of the flange. A ring 13 is mounted on the hub and abuts against said overhanging side of the sprocket wheel and is adjustably clamped to the flange by bolts 14 therethrough. In this manner when the bolts are tightened up the ring 13 is pulled toward the flange 11 and the sprocket wheel is wedgingly forced on to said flange so that it must turn therewith as a unit.

In this manner the said sprocket wheel may be initially adjusted and set relative to the opposite one so that the pull on both chains may be accurately equalized, thus eliminating the possibility of either shaft being strained by an unevenly distributed pull.

The shaft 2 is driven from the power take-off shaft of the tractor by a double chain drive unit which includes a double sprocket 15 on the shaft 2. Said chain drive is as usual connected to the engine of the tractor with a manually controlled clutch unit therebetween. The rotary digger is thus driven by the rotation of the shaft 2. Since the digging blades sometimes strike a rigid obstruction underground which is apt to break the chain or other relatively weak and expensive part which cannot always be replaced at short notice, we connect the sprocket 15 of the chain drive to the shaft 2 in such a manner that the driving strains are taken by a pair of shear bolts which may be easily and cheaply replaced if fractured, and a spare supply of which can be easily carried in the tool box of the tractor.

Said sprocket wheel is therefore mounted as follows:

Keyed on the shaft 2 is a sleeve or hub 16 having a flange 17 projecting outwardly intermediate its ends. The double sprocket wheels are formed as a unit turnable on the flange and hub and have in common a ring-like web 18 which bears against the flange 17, so that the shear bolts 19 may be placed through the web and flange to hold the same together in driving relation.

All the sprocket wheels are provided on both sides and between their teeth at the bases of the same with curved inwardly extending recesses 20. In this manner the sprocket wheels between the teeth are somewhat narrower than the teeth themselves and the chain rollers which ride therebetween. The area of contact of the faces of said chain rollers and the sprocket wheels are so reduced at these points that the chances for dirt to become packed between the parts is minimized and any such dirt as may adhere to the wheels or chain rollers will be pushed into the recesses as the chain engages the wheel and will drop clear of the wheel. The latter is therefore self-cleaning and will not tend to clog up and pack with dirt as is the case with the ordinary form of sprocket wheel under similar working conditions.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A means for adjusting the position of a gear relative to a shaft comprising a hub fixed on the shaft, an annular flange projecting from the hub, the peripheral face of the flange being tapered, the body of the gear being of ring form the bore of which is tapered to wedgingly engage the tapered periphery of the flange, a ring plate on the hub flange engaging that face of the gear body lying adjacent the small end of the bore thereof, and means to draw the plate and flange toward each other to cause the plate to wedge the gear onto the flange.

TONY S. MILLER.
LOOK L. CHONG.
JUE L. CHONG.
SAM L. CHONG.